United States Patent
Desabhatla

(10) Patent No.: US 9,145,833 B2
(45) Date of Patent: Sep. 29, 2015

(54) GAS TURBINE STARTUP CONTROL

(75) Inventor: Sreedhar Desabhatla, Hyderabad (IN)

(73) Assignee: General Electric Company, Schenectady, NY (US)

(*) Notice: Subject to any disclaimer, the term of this patent is extended or adjusted under 35 U.S.C. 154(b) by 1052 days.

(21) Appl. No.: 12/786,945

(22) Filed: May 25, 2010

(65) Prior Publication Data
US 2011/0289934 A1    Dec. 1, 2011

(51) Int. Cl.
F02C 7/22    (2006.01)
F02C 7/26    (2006.01)

(52) U.S. Cl.
CPC .................................... F02C 7/26 (2013.01)

(58) Field of Classification Search
CPC .................................. F02C 7/268; F02C 7/26
USPC .................................. 60/778, 786, 788, 39.13
See application file for complete search history.

(56) References Cited

U.S. PATENT DOCUMENTS

| | | | |
|---|---|---|---|
| 3,176,959 A * | 4/1965 | Ellenberger .................... 415/19 |
| 3,902,073 A * | 8/1975 | Lafuze ............................ 290/46 |
| 4,043,119 A * | 8/1977 | Faulkner ......................... 60/788 |
| 4,204,258 A | 5/1980 | Zitelli et al. |
| 4,490,791 A | 12/1984 | Morrison |
| 4,587,474 A * | 5/1986 | Espelage et al. ............... 318/709 |
| 5,315,817 A * | 5/1994 | Vannini et al. ............. 60/39.091 |
| 5,369,948 A | 12/1994 | Vertens et al. |
| 5,783,932 A | 7/1998 | Namba et al. |
| 5,966,925 A * | 10/1999 | Torikai et al. .................... 60/778 |
| 6,018,941 A * | 2/2000 | Massey ............................ 60/788 |
| 6,035,626 A * | 3/2000 | Wahl et al. ....................... 60/773 |
| 6,107,775 A * | 8/2000 | Rice et al. ....................... 318/811 |
| 6,605,928 B2 | 8/2003 | Gupta et al. |
| 6,888,263 B2 | 5/2005 | Satoh et al. |
| 6,960,900 B2 | 11/2005 | Fogarty et al. |
| 7,000,405 B2 * | 2/2006 | McKelvey et al. .............. 60/786 |
| 7,448,220 B2 * | 11/2008 | Schmidt et al. .................. 60/788 |
| 7,690,205 B2 * | 4/2010 | Delaloye et al. ................. 60/786 |
| 2004/0057257 A1 * | 3/2004 | Sarlioglu et al. ................ 363/49 |
| 2004/0237538 A1 * | 12/2004 | McKelvey et al. .............. 60/778 |
| 2005/0073152 A1 | 4/2005 | Gupta et al. |
| 2005/0279102 A1 * | 12/2005 | O'Connor ....................... 60/778 |
| 2006/0012321 A1 * | 1/2006 | Rozman et al. ................ 318/432 |
| 2006/0233637 A1 | 10/2006 | Yakushi et al. |

FOREIGN PATENT DOCUMENTS

| | | |
|---|---|---|
| CA | 1201188 | 2/1986 |
| JP | 01182531 | 7/1989 |
| JP | 6159098 A | 6/1994 |
| JP | 108999 A | 1/1998 |
| JP | 1037762 A | 2/1998 |
| JP | 10127075 A | 5/1998 |

OTHER PUBLICATIONS

Chinese Office Action for CN Application No. 201110152116.3, dated Jun. 4, 2014, pp. 1-16.

Japanese Office Action for JP Application No. 2011-1145254, dated Mar. 31, 2015, pp. 1-12.

* cited by examiner

*Primary Examiner* — Gerald L Sung

(57) ABSTRACT

A method for gas turbine start-up can include placing a static starter in a torque control mode, sending a torque reference to the static starter to establish a startup torque for the gas turbine, setting current set points for the static starter and modulating a current output to achieve the startup torque.

13 Claims, 5 Drawing Sheets

GAS TURBINE STARTUP CONTROL

BACKGROUND OF THE INVENTION

The subject matter disclosed herein relates to gas turbines, and more particularly to a torque control system and method for gas turbine start-up.

During a gas turbine startup, there are typically two sources of torque to accelerate the gas turbine to full speed with no load. One source is from the gas turbine itself after it is fired and the other source is from a starter, external to the gas turbine, typically a static starter. Conventionally, an average time taken by the gas turbine to reach full speed with no load can be reduced by changing the initial firing of the gas turbine. However, by changing the firing of the gas turbine, operating temperatures of the gas turbine can be increased, which can damage various hot gas path components. As such, it is typically desirable to increase starting torque of the gas turbine by the external static starter, which can be an electric motor or power converter, for example. However, many static starters have set operational points corresponding to set RPM settings, which do not take into account changing operational parameters of the gas turbine, which can increase the amount of time for the gas turbine to start up.

BRIEF DESCRIPTION OF THE INVENTION

According to one aspect of the invention, a method for gas turbine start-up is described. The method includes placing a static starter in a torque control mode, sending a torque reference to the static starter to establish a startup torque for the gas turbine, setting current set points for the static starter and modulating a current output to achieve the startup torque.

According to another aspect of the invention, a computer readable storage medium for gas turbine start-up is described. The computer readable storage medium can include instructions for causing a computer to implement a method, the method including placing a static starter in a torque control mode, sending a torque reference to the static starter to establish a startup torque for the gas turbine, setting current set points for the static starter and modulating a current output to achieve the startup torque.

According to yet another aspect of the invention, a gas turbine system for gas turbine start-up is described. The system can include a gas turbine, a gas turbine controller operatively coupled to the gas turbine, a static starter operatively coupled to the gas turbine and the gas turbine controller and a synchronous generator disposed between and operatively coupled to the gas turbine and the static starter, wherein the turbine controller is configured to place the static starter into a torque control mode, the static starter having a startup torque profile having associated current set points.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
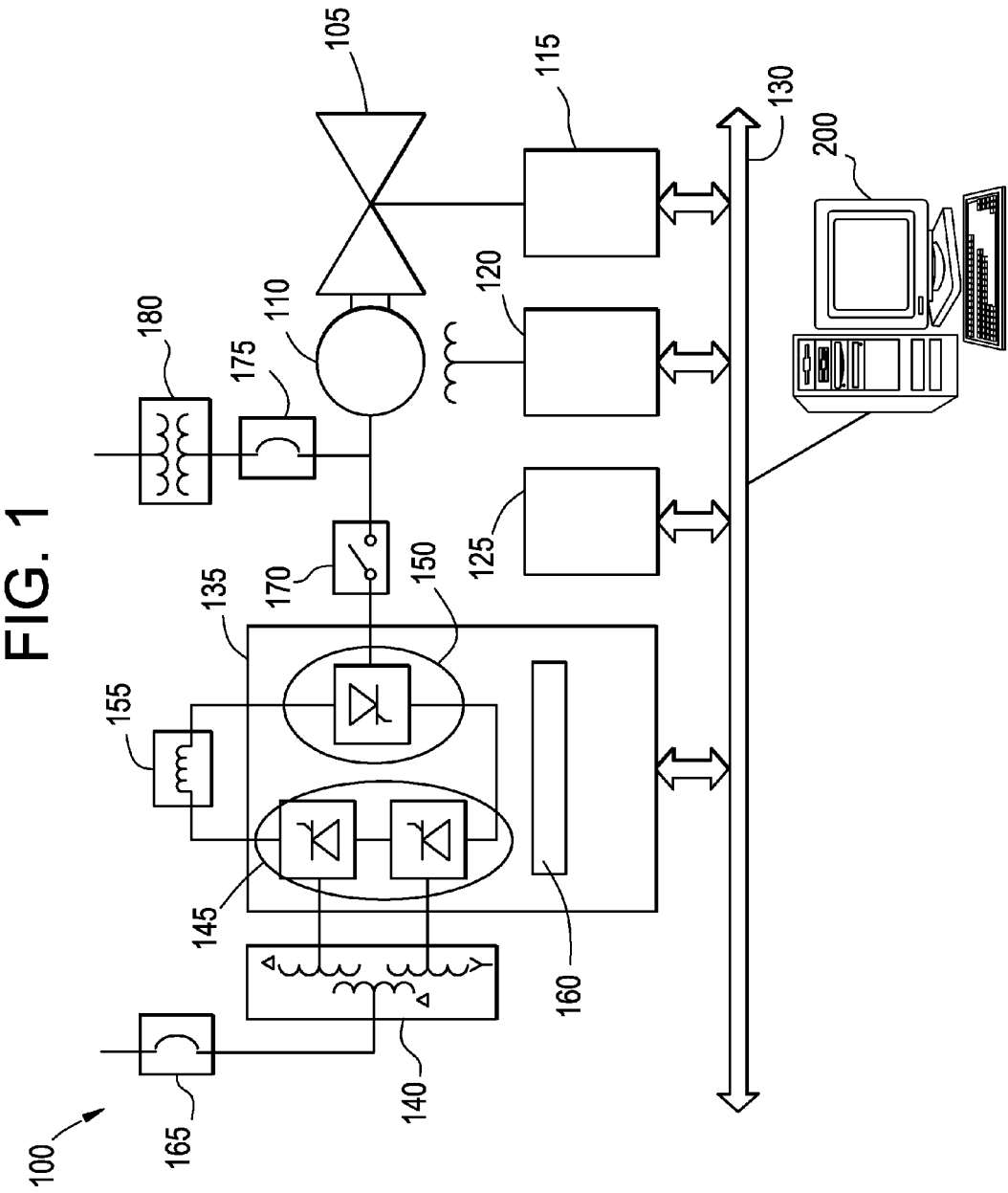
FIG. 1 illustrates an exemplary system for gas turbine start-up torque control.

FIG. 1 illustrates an exemplary system 100 for gas turbine start-up torque control. In exemplary embodiments, the system 100 can include a gas turbine 105 operatively controlled to a synchronous generator 110. As described herein, upon start-up, the synchronization generator 110 can be electrically excited to produce rotational torque to initiate rotation in the gas turbine without the high temperatures of gas paths typically required to start-up the gas turbine. A turbine controller 115 can be operatively coupled to the gas turbine. In exemplary embodiments, the turbine controller 115 provides the control and monitoring of the gas turbine 105. The system 100 can further include an exciter module 120 operatively coupled to the synchronous generator 110. In exemplary embodiments, the exciter module 120 produces a field excitation current to control generator ac terminal voltage and/or the reactive volt-amperes for the synchronous generator 110. The system 100 can further include a human-machine interface 125, which can be part of an overall control system (e.g., a computer) 200 as described further with respect to FIG. 2. In exemplary embodiments, the control system 200 can be operatively coupled to the system 100 via an Ethernet 130, which can be part of a larger network as further described with respect to FIG. 2.

Referring still to FIG. 1, the system 100 can further include a static starter 135, which is an adjustable speed ac drive system to start a gas turbine-generator set via the synchronous generator 110. By operating the synchronous generator 100 as a synchronous motor, the static starter 135 accelerates the gas turbine 105 according to a specific speed profile that provides starting conditions for the gas turbine as described herein. As described further herein, static starter control constants decide current set points at given speeds. In exemplary embodiments, control constants are not altered when the synchronous generator 110 is running. The static starter 135 eliminates the need for separate starting hardware, such as an electric motor or diesel engine, torque converters, and associated auxiliary equipment. In exemplary embodiments, the turbine controller 115 sends run and torque commands, and speed reference set points to the static starter 135.

In exemplary embodiments, power magnetics are implemented in the system 100 to provide isolation, voltage transformation, and impedance. For example, an isolation transformer 140 feeds 3-phase ac input power to static starter power converters, a source bridge 145 and a load bridge 150, forming an input bridge. The isolation transformer 140 provides isolation from an ac system bus (not shown) and provides the correct voltage and phasing to the bridges 145, 150. The static starter 135 can be a current controlled device, and the input bridge provides controlled current to feed a DC link reactor 155. The DC link reactor can be an air core inductor that provides inductance to smooth the current delivered by the bridges 145, 150, and keeps the current continuous over the system 100 operating range. The system 100 can further include a control supply 160 for the static starter 135.

Various circuit breakers and motor operated disconnect switches are implemented in the system 100 to make the appropriate power connections for a static start operation. A circuit breaker 165 is implemented to connect a primary side of the isolation transformer 140 to a system auxiliary bus (not shown). The static starter 135 can control the breaker 165 and is closed during starting. The breaker 165 can optionally be left closed after the start is complete. A motor 170 is an operated disconnect switch implemented to connect the load bridge 150 output bus to the synchronous generator 110 (e.g., a generator stator). The load bridge 150 can be commutated by load where as the source bridge 145 can be line commutated. In exemplary embodiments, the turbine controller 115 controls the motor 170, which can be powered down during starting and powered up after the start is complete. A circuit breaker 175 is implemented to connect the synchronous generator 110 to the system bus via a set up transformer 180. The turbine controller 115 controls the circuit breaker 175 and it can be open during startup. In exemplary embodiments, the system 100 controls the torque supplied at the output of the torque supplied by the load bridge 150, which can be considered a load commutated inverter.

Figure 2:
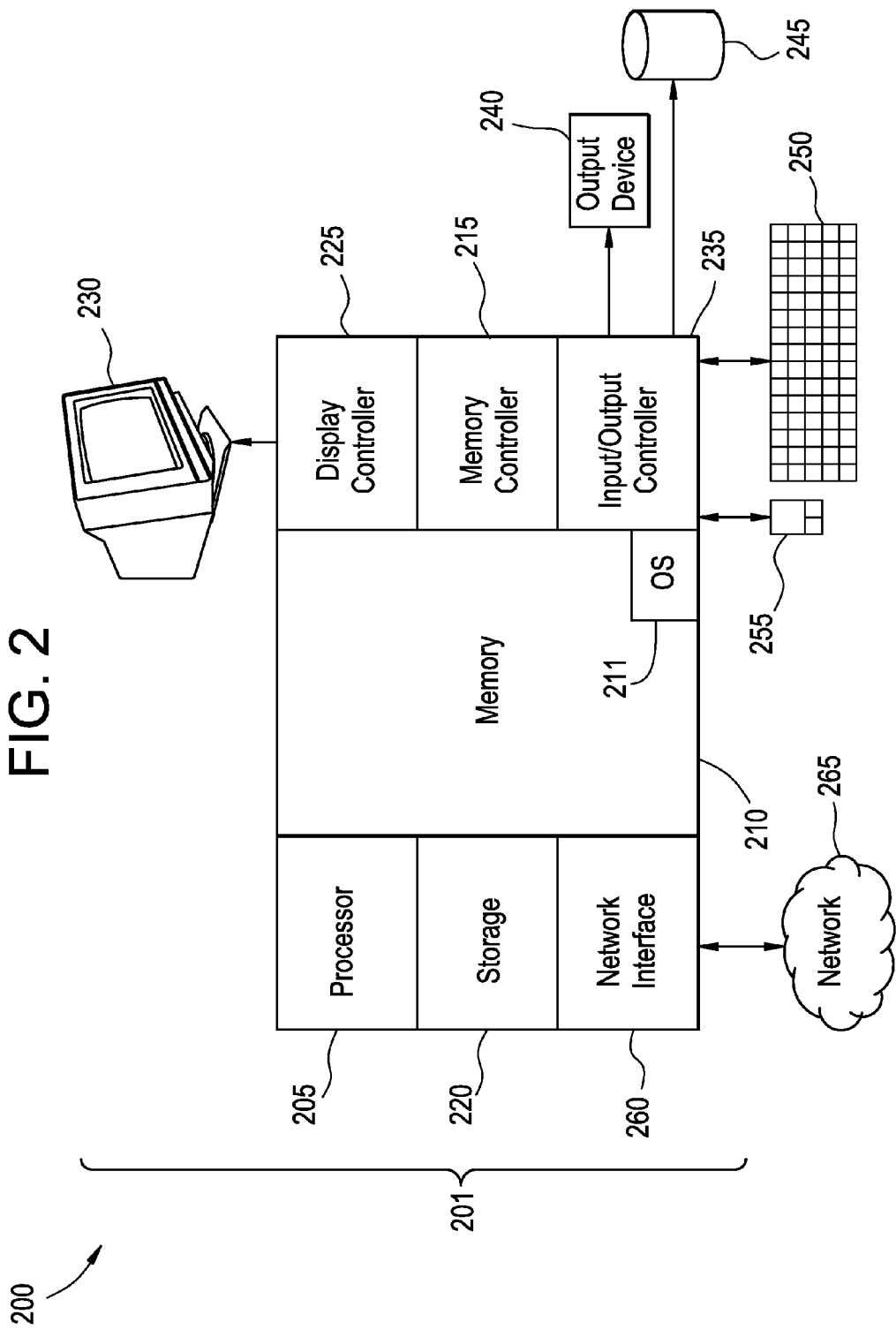
FIG. 2 illustrates an exemplary embodiment of a control system for torque control for gas turbine startup.

FIG. 2 illustrates an exemplary embodiment of a control system 200 for torque control for gas turbine startup. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 200 therefore includes general-purpose computer 201.

In exemplary embodiments, in terms of hardware architecture, as shown in FIG. 2, the computer 201 includes a processor 205, memory 210 coupled to a memory controller 215, and one or more input and/or output (I/O) devices 240, 245 (or peripherals) that are communicatively coupled via a local input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 205 is a hardware device for executing software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The software in memory 210 may include one or more separate programs, each of which comprises an ordered listing of executable instructions for implementing logical functions. In the example of FIG. 2, the software in the memory 210 includes the torque control methods described herein in accordance with exemplary embodiments and a suitable operating system (OS) 211. The operating system 211 essentially controls the execution of other computer programs, such as the torque control systems and methods as described herein, and provides scheduling, input-output control, file and data management, memory management, and communication control and related services.

The torque control methods described herein may be in the form of a source program, executable program (object code), script, or any other entity comprising a set of instructions to be performed. When a source program, then the program needs to be translated via a compiler, assembler, interpreter, or the like, which may or may not be included within the memory 210, so as to operate properly in connection with the OS 211. Furthermore, the torque control methods can be written as an object oriented programming language, which has classes of data and methods, or a procedure programming language, which has routines, subroutines, and/or functions.

In exemplary embodiments, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In exemplary embodiments, the system 200 can further include a network interface 260 for coupling to a network 265, which can include the Ethernet 130. The network 265 can be an IP-based network for communication between the computer 201 and any external server, client and the like via a broadband connection. The network 265 transmits and receives data between the computer 201 and external systems. In exemplary embodiments, network 265 can be a managed IP network administered by a service provider. The network 265 may be implemented in a wireless fashion, e.g., using wireless protocols and technologies, such as WiFi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the software in the memory 210 may further include a basic input output system (BIOS) (omitted for simplicity). The BIOS is a set of essential software routines that initialize and test hardware at startup, start the OS 211, and support the transfer of data among the hardware devices. The BIOS is stored in ROM so that the BIOS can be executed when the computer 201 is activated.

When the computer 201 is in operation, the processor 205 is configured to execute software stored within the memory 210, to communicate data to and from the memory 210, and to generally control operations of the computer 201 pursuant to the software. The torque control methods described herein and the OS 211, in whole or in part, but typically the latter, are read by the processor 205, perhaps buffered within the processor 205, and then executed.

When the systems and methods described herein are implemented in software, as is shown in FIG. 2, the methods can be stored on any computer readable medium, such as storage 220, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the torque control methods are implemented in hardware, the torque control methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
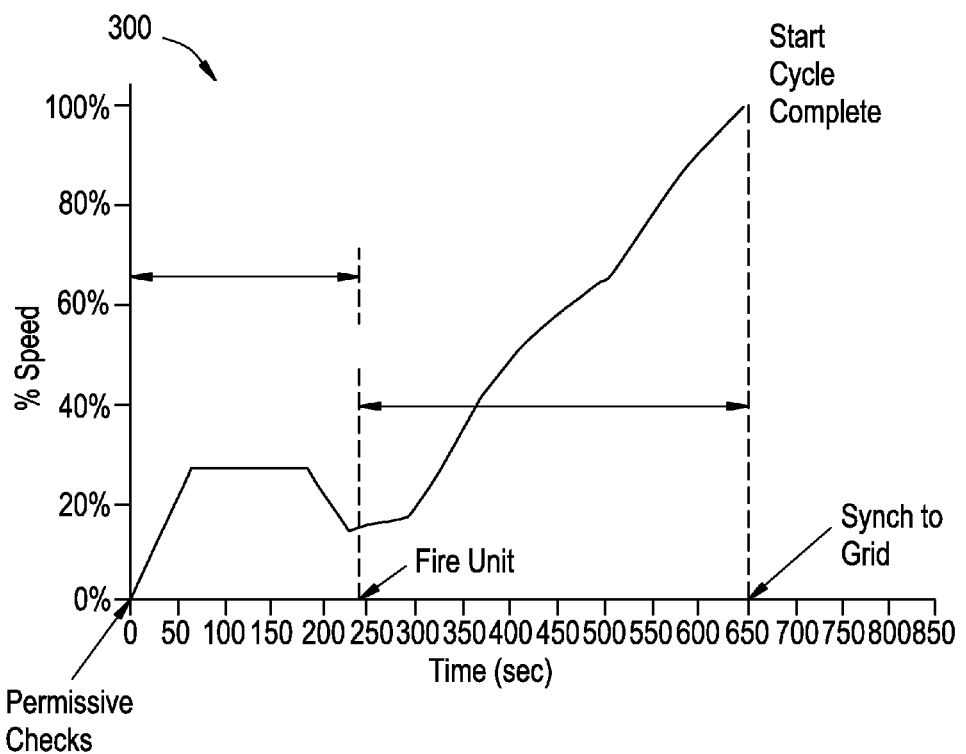
FIG. 3 illustrates a plot of speed versus time illustrating a start profile for a gas turbine in exemplary embodiments.

FIG. 3 illustrates a plot 300 of speed versus time illustrating a start profile for a gas turbine in exemplary embodiments. At time 0, the turbine 105 is powered down and the static starter 135 has not initiated torque. In exemplary embodiments, permissive checks can be performed prior to start-up. Between time 0 and approximately time 250, the static starter 135 starts at an approximate turning gear speed of 3-6 RPMS, which ramps up to about 30% of the rated speed of the gas turbine 105. Between about time 0 and about time 250, there is less impact on the hot gas path parts. At about time 250, the gas turbine 105 is fired, which now has an initial rotational torque as provided by the static starter 135. Between times 250 and 650, the gas turbine 105 continues to start up as it ramps toward the full 100% of the rated speed, during which there is increased impact on the hot gas path parts. In exemplary embodiments, at about 85-91% of the rated speed, the static starter 135 is disengaged and the start cycle is complete. During start-up, the turbine control 115 sends run and torque commands as well as speed reference set points to the static starter 135. Static starter control constants determine current set points at a given speed as further described herein. Control constants are not altered when the static starter 135 is miming. The start profile illustrated is an example only, and in other exemplary embodiments, other % speed rates and times are contemplated.

Figure 4:
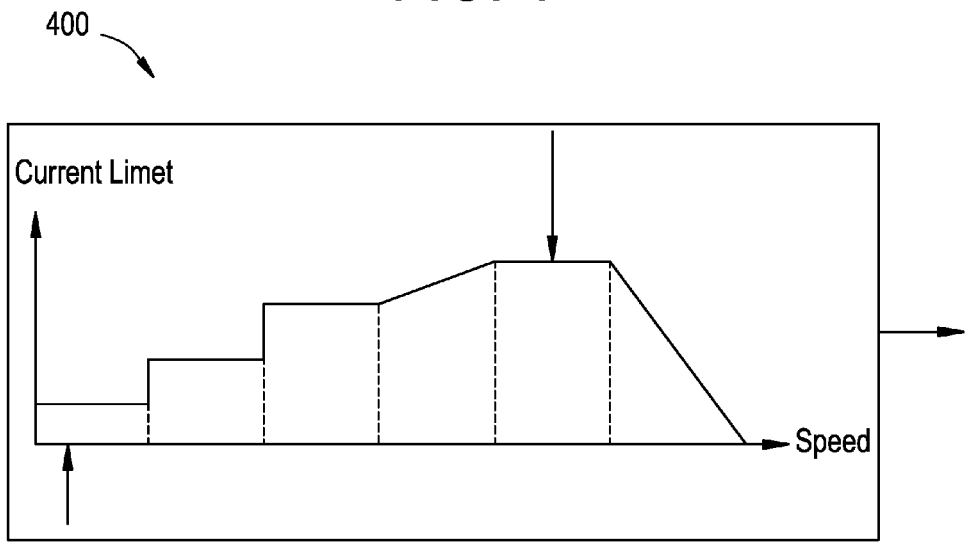
FIG. 4 illustrates a plot of current limit versus percentage of rated speed for current set points in accordance with exemplary embodiments.

FIG. 4 illustrates a plot 400 of current limit versus percentage of rated speed for current set points in accordance with exemplary embodiments. As described above, the speed reference points can be set up, which correspond to current set points for the static starter. Once set, the current set points can vary the speed of the static starter 135 during start up. In exemplary embodiments, current set points on the Y-axis are set for different % of rated speeds on the x-axis. Based on what the static starter 135 reads, its current output, and thus speed varies based on the predetermined y-axis set points. In exemplary embodiments, the plot 400 illustrates both step and ramped current set points, until the static starter 135 remains steady between approximately 48% and 81% of rated speed. Between 81% and 90% of rated speed, the static starter 135 is disengaged as described above. The current set points illustrated are just examples of how the speed reference points can be varied during start-up. In other exemplary embodiments, other current set points at % of rated speeds are contemplated.

Figure 5:
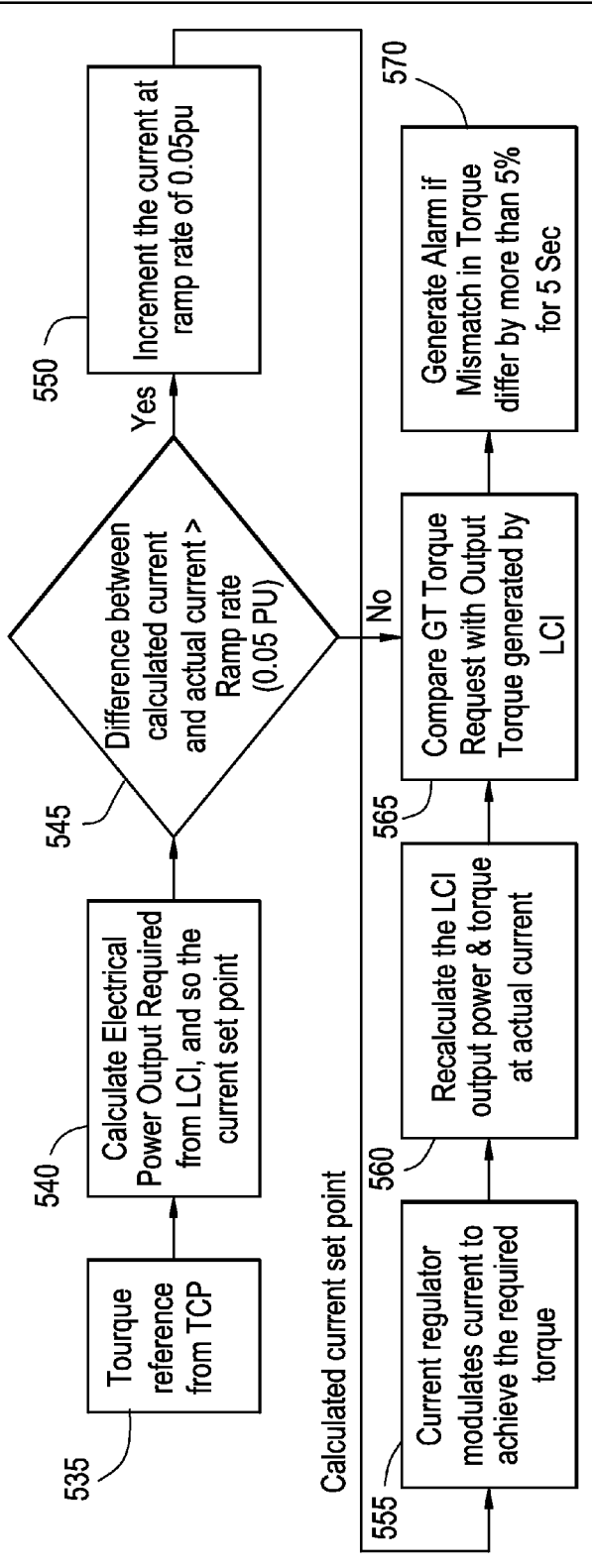
FIG. 5 illustrates a flow chart of a torque control method in accordance with exemplary embodiments.

FIG. 5 illustrates a flow chart 500 of a torque control method in accordance with exemplary embodiments. At block 520, when conditions that the static starter 135 is ready to start at 505, is not running at block 510 and a fast start enable signal is sent by the turbine controller 115 at block 515, are all true, then the torque control is enabled. At block 525, the static starter 135 remains in torque control mode when the speed reference remains above 95% at block 530 and the torque control remains enabled from block 520. The torque control mode then enables the method blocks as now described.

Referring still to FIG. 5, at block 535 torque reference points are received at the static starter 135 from the turbine controller 115 as described above. At block 540, the turbine controller 115 calculates electrical output required from the static starter 135, and therefore the current set point(s). At block 545, the method 500 determines a difference between a calculated current and actual current in the static starter 135.

If the difference between a calculated current and actual current in the static starter 135 is greater than a ramp rate set at 0.05 per unit (PU), then at block 550, the turbine controller 115 increments the current at a ramp rate of 0.05 PU. For purposes of calculation, 1 PU of current=756 Amps=5000 digital counts, and 0.05 PU=37.6 A=250 digital counts. At block 555, the static starter 135 modulates current to achieve the desired torque via a current regulator defined by the bridges 145, 150 and the DC link reactor 155. At block 560, the turbine controller 115 recalculates the static starter output and torque at the actual current produced. At block 565 the turbine controller 115 compares the gas turbine 105 torque request with the output generated by the static starter 135. In addition, if at block 545 the difference between the calculated current and actual current in the static starter 135 is not greater than a ramp rate set at 0.05 PU, then at block 565 the turbine controller 115 compares the gas turbine 105 torque request with the output generated by the static starter 135. At block 570, the turbine controller 115 generates an alarm if there is a mismatch in torque difference of more than about 5% for five seconds. Blocks 535, 540, 545, 550, 555, 560, 565, 570 repeat while the static starter 135 is in torque control mode from block 525.

Conventionally, the current output from static starters such as the static starter 135 is calculated from speed-current profiles such as the one illustrated in FIG. 4. The output of the Speed-current profile is then input to the current regulator defined by the bridges 145, 150 and the DC link reactor 155.

In exemplary embodiments, the systems and methods described herein compute the required current based on the torque requirement coming from turbine controller 115, by passing the speed-current profile.

Figure 6:
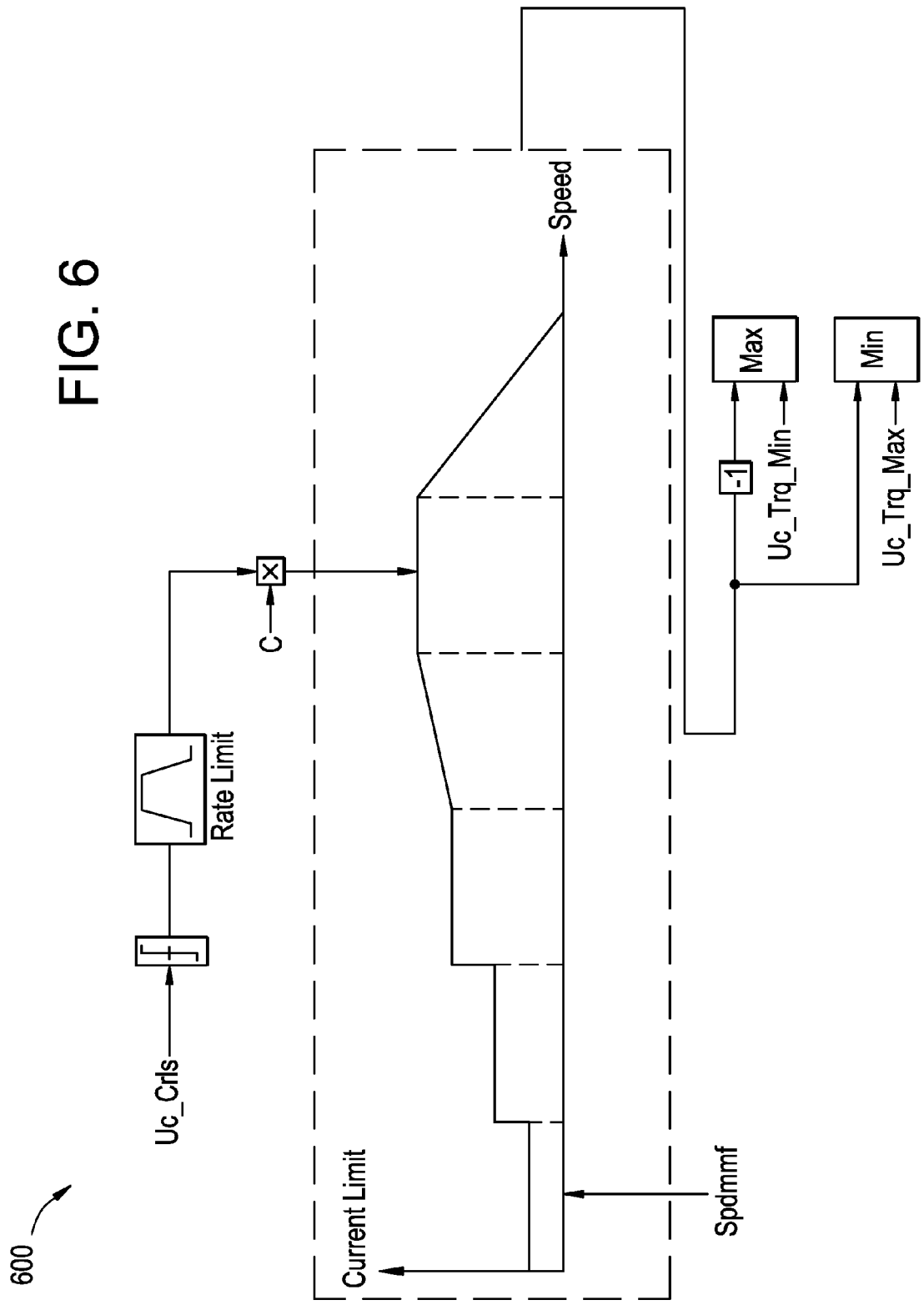
FIG. 6 illustrates a process flow for a torque control implementation in accordance with exemplary embodiments.

FIG. 6 illustrates a process flow 600 for a torque control implementation in accordance with exemplary embodiments. In exemplary embodiments, when the static starter 135 is in torque control mode, a variable, uc_crls generated by the turbine controller 115 is generated as a multiplication factor, which can have an upper value of 1.5 PU and a lower value of 0.2 PU. The uc_crls variable can be rate limited to 0.01 PU/sec, and then multiplied with a constant, C, which can be set at 1.45503. The static starter 135 in torque control mode can then be input to and control the speed-current profile, which passes its output to MN and MAX functions. In exemplary embodiments, UC_Trq_min, UC_Trq_max, are input into the MN and MAX functions respectively. In exemplary embodiments, the output of the speed-current profile passes from the MN BLOCK, which allows only the minimum of the two inputs to pass through. When the system 100 is placed into torque control mode, uc_crls can be increased from 1 to 3, thereby maxing out the variable output from speed-current profile to MIN BLOCK. In exemplary embodiments, the constant UC_Trq_max, coming from the algorithm, to the MIN block is ensured to always stay less and is passed through, thus controlling the current input to the current regulator. In exemplary embodiments, current is calculated by the static starter 135 firmware, for which conventional static starters can be over ridden with new current set point calculated from application code, with out modifying the firmware In exemplary embodiments, based on the ambient environmental conditions of the gas turbine 105 during a start-up, the gas turbine controller 115 determines the amount of torque required from the static starter 135 to accelerate the gas turbine 105 to full speed no load. The static starter 135 calculates equivalent electrical power and derives various set points. The static starter 135 starts generating the required additional torque that would aid the gas turbine torque, which helps in reducing the start time. Conventionally, if the same amount of additional torque is generated by the increasing the firing/fuel of the gas turbine 105, it results in high operating temperatures and hence results in reduction of hot gas path parts life. The systems and methods described herein achieve desirable reduced start-up profiles (e.g., ~six minutes).

In exemplary embodiments, the systems and methods described herein can calculate the torque as now described. Mechanical Power, P is given by: $P=T*\omega$, where T is torque and $\omega$ is the rotational velocity. The rotational velocity is given by: $\omega=2\Pi*f$, where f is the number of rotations per second, and given by f=N (rpm)/60, which is equivalent to 1.732*Volts*Amps*Power factor. As such, $$\omega = \frac{2\Pi * N}{60},$$

and $$\text{Mechanical Power } P(\text{in Watt}) = T(\text{in } N\text{-}m) * \frac{2\Pi * N}{60},$$

where P in HP=P (in watt)/745.7. Therefore, $$P \text{ in } HP*745.7 = \frac{2\Pi * N * T(\text{in } N\text{-}m)}{60} \quad (1)$$

$$= 1.732 * \text{Volts} * \text{Amps} * \text{Power factor}$$

(Equivalent electrical power).

In solving Equation (1) above, the required current set point is derived. Similarly, the Torque request in Lbf-ft can be obtained as well, as follows:

$$T(\text{in lbf-ft}) = T(\text{in } N\text{-}m)/1.36$$

$$T(\text{in lbf-ft}) = \frac{P \text{ in } HP * 745.7 * 60}{N * 2\Pi * 1.356}$$

$$T(\text{in lbf-ft}) P(HP) * 5251 / N(rpm)$$

Technical effects include achieving a reduced start up profile and generating a start up torque with a reduced exposure of turbine components to the hot gas path during start up.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for gas turbine start-up, the method comprising:
    placing a static starter in a torque control mode;
    sending a torque reference and speed reference to the static starter to establish a startup torque for the gas turbine;
    setting a current set point for the static starter based on the torque reference;
    the static starter modulating a current output based on the current set point to achieve the startup torque;
    calculating an electrical power output for the static starter corresponding to the torque reference to determine the current set point;
    determining a difference between a calculated static starter current, and an actual static starter current; and
    determining if the difference between the calculated static starter current, and the actual static starter current is greater than a predetermined ramp rate; and
    in response to the difference between the calculated static starter current, and the actual static starter current being less than the predetermined ramp rate, recalculating the electrical power output for the static starter and startup torque at the actual static starter current.

2. The method as claimed in claim 1 wherein placing the static starter in a torque control mode comprises:
    a turbine controller sending a torque enable signal to the static starter.

3. The method as claimed in claim 1 further comprising in response to the difference between the calculated static starter current, and the actual static starter current being greater than the predetermined ramp rate, incrementing the ramp rate.

4. The method as claimed in claim 1 further comprising comparing torque from the gas turbine to the startup torque from the static starter.

5. The method as claimed in claim 4 further comprising generating an alarm in response to a mismatch in the torque from the gas turbine and the startup torque from the static starter by more than a predetermined percentage for a predetermined time period.

6. A computer readable storage medium for gas turbine start-up, the computer readable storage medium including instructions for causing a computer to implement a method, the method comprising:
    placing a static starter comprising a current regulator in a torque control mode;
    sending a torque reference and speed reference to the static starter to establish a startup torque for the gas turbine;
    setting a current set point for the static starter based on the torque reference; and
    the static starter modulating a current output based on the based on the current set point derived from the torque reference to achieve the startup torque, wherein
    the method further comprises calculating an electrical power output for the static starter corresponding to the torque reference to determine the current set point, determining a difference between a calculated static starter current, and an actual static starter current, determining if the difference between the calculated static starter current, and the actual static starter current is greater than a predetermined ramp rate, and in response to the difference between the calculated static starter current, and the actual static starter current being less than the predetermined ramp rate, recalculating the electrical power output for the static starter and startup torque at the actual static starter current.

7. The computer readable storage medium as claimed in claim 6 wherein placing the static starter in a torque control mode comprises:
    a turbine controller sending a torque enable signal to the static starter.

8. The computer readable storage medium as claimed in claim 6 wherein the method further comprises in response to the difference between the calculated static starter current, and the actual static starter current being greater than the predetermined ramp rate, incrementing the ramp rate.

9. The computer readable storage medium as claimed in claim 6 wherein the method further comprises comparing torque from the gas turbine to the startup torque from the static starter.

10. The computer readable storage medium as claimed in claim 9 wherein the method further comprises generating an alarm in response to a mismatch in the torque from the gas turbine and the startup torque from the static starter by more than a predetermined percentage for a predetermined time period.

11. A gas turbine system for gas turbine start-up, the system comprising:
- a gas turbine;
- a gas turbine controller operatively coupled to the gas turbine;
- a static starter comprising a current regulator and operatively coupled to the gas turbine and the gas turbine controller; and
- a synchronous generator disposed between and operatively coupled to the gas turbine and the static starter,
- wherein the turbine controller is configured to place the static starter into a torque control mode, the static starter having a startup torque profile having an associated current set point, and the static starter being configured to modulate current output based on the current set point and the current regulator, determine a difference between a calculated static starter current, and an actual static starter current, determine if the difference between the calculated static starter current, and the actual static starter current is greater than a predetermined ramp rate, in response to the difference between the calculated static starter current, and the actual static starter current being greater than the predetermined ramp rate, increment the ramp rate, and in response to the difference between the calculated static starter current, and the actual static starter current being less than the predetermined ramp rate, recalculate the electrical power output for the static starter and startup torque at the actual static starter current.

12. The system as claimed in claim 11 wherein the turbine controller calculates a torque reference for the static starter, and the static starter calculates an electrical power output corresponding to the torque reference to determine the current set point.

13. The system as claimed in claim 11 wherein the turbine controller is further configured to:
- compare torque from the gas turbine to the startup torque from the static starter; and
- generate an alarm in response to a mismatch in the torque from the gas turbine and the startup torque from the static starter by more than a predetermined percentage for a predetermined time period.

* * * * *